(12) United States Patent
Chen et al.

(10) Patent No.: US 8,607,070 B2
(45) Date of Patent: Dec. 10, 2013

(54) SECURE STORAGE SYSTEM AND METHOD OF USE

(75) Inventors: Ben Wei Chen, Fremont, CA (US); Yungteh Chien, Lake Forest, CA (US)

(73) Assignee: Kingston Technology Corporation, Fountain Valley, CA (US)

( * ) Notice: Subject to any disclaimer, the term of this patent is extended or adjusted under 35 U.S.C. 154(b) by 1498 days.

(21) Appl. No.: 11/643,101

(22) Filed: Dec. 20, 2006

(65) Prior Publication Data

US 2008/0155276 A1 Jun. 26, 2008

(51) Int. Cl.
*H04L 29/06* (2006.01)

(52) U.S. Cl.
USPC ........... 713/193; 713/182; 713/183; 713/184; 713/185; 713/186

(58) Field of Classification Search
USPC .......................................... 713/182–186, 193
See application file for complete search history.

(56) References Cited

U.S. PATENT DOCUMENTS

| | | |
|---|---|---|
| 5,012,514 A | 4/1991 | Renton |
| 5,175,766 A | 12/1992 | Hamilton |
| 5,394,532 A | 2/1995 | Belsan |
| 5,442,704 A | 8/1995 | Holtey |
| 5,469,564 A | 11/1995 | Junya |
| 5,530,845 A | 6/1996 | Hiatt et al. |
| 5,758,050 A | 5/1998 | Brady et al. |
| 5,768,373 A | 6/1998 | Lohstroh et al. |
| 5,937,066 A | 8/1999 | Gennaro et al. |
| 5,999,711 A | 12/1999 | Misra et al. |
| 6,098,119 A | 8/2000 | Surugucchi et al. |
| 6,134,630 A | 10/2000 | McDonald et al. |
| 6,138,176 A | 10/2000 | McDonald et al. |
| 6,148,387 A | 11/2000 | Galasso et al. |
| 6,226,732 B1 | 5/2001 | Pei et al. |
| 6,311,269 B2 * | 10/2001 | Luckenbaugh et al. ...... 713/154 |
| 6,324,537 B1 | 11/2001 | Moran |
| 6,408,074 B1 | 6/2002 | Longhran |
| 6,421,760 B1 | 7/2002 | McDonald et al. |

(Continued)

FOREIGN PATENT DOCUMENTS

| | | |
|---|---|---|
| CN | 101112035 A | 1/2008 |
| WO | 0161692 A1 | 8/2001 |
| WO | 2008140868 | 11/2008 |

OTHER PUBLICATIONS

Krutov, "Choosing eXFlash Storage on IBM eX5 Servers", Dec. 9, 2011, IBM Redpaper, p. 1-32.

*Primary Examiner* — Jeffrey Pwu
*Assistant Examiner* — Thong Truong
(74) *Attorney, Agent, or Firm* — Sawyer Law Group, P.C.

(57) ABSTRACT

A secure storage system is disclosed. The secure storage system comprises a crypto engine and a storage device. The crypto engine comprises a random number generator; a hash function; a general encryption engine; and a data encryption engine. The secure storage system further includes a storage device coupled to the crypto engine. The storage device includes a storage array. The storage array includes a public partition, a secure partition and a system partition. The public partition is accessible to the public. The secure partition is accessible through the password authentication. The system partition is accessible only by the secure storage system. The password authentication is two-level instead of one, to avoid hash collision or insider tampering. The secure partition is accessed with "access gating through access key" instead of "access control through comparison." The password can be changed without reformatting the secure storage.

10 Claims, 8 Drawing Sheets

(56) References Cited

U.S. PATENT DOCUMENTS

| | | | |
|---|---|---|---|
| 6,530,078 B1 | 3/2003 | Shmid et al. | |
| 6,549,981 B2 | 4/2003 | McDonald et al. | |
| 6,567,889 B1 | 5/2003 | KeKoning et al. | |
| 6,751,318 B2 | 6/2004 | Crandall | |
| 6,868,160 B1 | 3/2005 | Raji | |
| 6,877,044 B2 | 4/2005 | Lo et al. | |
| 6,880,054 B2 | 4/2005 | Cheng et al. | |
| 6,883,083 B1 | 4/2005 | Kemkar | |
| 7,003,623 B2 | 2/2006 | Teng | |
| 7,039,759 B2 | 5/2006 | Cheng et al. | |
| 7,043,684 B2 | 5/2006 | Joly | |
| 7,047,416 B2 | 5/2006 | Wheeler et al. | |
| 7,073,010 B2 | 7/2006 | Chen et al. | |
| 7,089,585 B1 | 8/2006 | Dharmarajan | |
| 7,096,354 B2 | 8/2006 | Wheeler et al. | |
| 7,110,982 B2 | 9/2006 | Feldman et al. | |
| 7,124,203 B2 | 10/2006 | Joshi et al. | |
| 7,127,606 B2 | 10/2006 | Wheeler et al. | |
| 7,133,845 B1 | 11/2006 | Ginter et al. | |
| 7,200,747 B2 | 4/2007 | Riedel et al. | |
| 7,269,004 B1 | 9/2007 | Ni et al. | |
| 7,344,072 B2 | 3/2008 | Gonzalez et al. | |
| 7,406,617 B1 | 7/2008 | Athreya et al. | |
| 7,438,234 B2 | 10/2008 | Bonalle et al. | |
| 7,454,531 B2 | 11/2008 | Shih | |
| 7,506,819 B2 | 3/2009 | Beenau et al. | |
| 7,591,018 B1 | 9/2009 | Lee | |
| 7,664,903 B2 | 2/2010 | Belonoznik | |
| 7,774,525 B2 | 8/2010 | Farhan et al. | |
| 2002/0080958 A1 | 6/2002 | Ober et al. | |
| 2002/0103943 A1 | 8/2002 | Lo et al. | |
| 2002/0108023 A1 | 8/2002 | Constable et al. | |
| 2003/0014653 A1 | 1/2003 | Moller et al. | |
| 2003/0018862 A1 | 1/2003 | Karnstedt et al. | |
| 2003/0110351 A1 | 6/2003 | Blood et al. | |
| 2003/0120865 A1 | 6/2003 | McDonald et al. | |
| 2004/0093495 A1 | 5/2004 | Engel | |
| 2004/0103288 A1* | 5/2004 | Ziv et al. | 713/185 |
| 2004/0123127 A1* | 6/2004 | Teicher et al. | 713/182 |
| 2004/0128468 A1 | 7/2004 | Lloyd-Jones | |
| 2004/0236958 A1 | 11/2004 | Teicher et al. | |
| 2005/0005044 A1 | 1/2005 | Liu et al. | |
| 2005/0005063 A1 | 1/2005 | Liu et al. | |
| 2005/0005131 A1 | 1/2005 | Yoshida et al. | |
| 2005/0033956 A1 | 2/2005 | Krempl | |
| 2005/0097348 A1 | 5/2005 | Jakubowski et al. | |
| 2005/0109841 A1 | 5/2005 | Ryan et al. | |
| 2005/0114679 A1 | 5/2005 | Bagga et al. | |
| 2005/0185463 A1 | 8/2005 | Kanamori et al. | |
| 2005/0193162 A1 | 9/2005 | Chou et al. | |
| 2005/0195975 A1 | 9/2005 | Kawakita | |
| 2005/0220305 A1 | 10/2005 | Fujimoto et al. | |
| 2005/0250473 A1 | 11/2005 | Brown et al. | |
| 2005/0281088 A1 | 12/2005 | Ishidoshiro et al. | |
| 2006/0015946 A1 | 1/2006 | Yagawa | |
| 2006/0047794 A1 | 3/2006 | Jezierski | |
| 2006/0072743 A1 | 4/2006 | Naslund et al. | |
| 2006/0075485 A1* | 4/2006 | Funahashi et al. | 726/19 |
| 2006/0075488 A1 | 4/2006 | Barrett et al. | |
| 2006/0101205 A1 | 5/2006 | Bruning et al. | |
| 2006/0104441 A1 | 5/2006 | Johansson et al. | |
| 2006/0131431 A1 | 6/2006 | Finn | |
| 2006/0143422 A1 | 6/2006 | Mashima et al. | |
| 2006/0208066 A1 | 9/2006 | Finn et al. | |
| 2006/0219776 A1 | 10/2006 | Finn | |
| 2006/0277411 A1* | 12/2006 | Reynolds et al. | 713/182 |
| 2007/0136606 A1 | 6/2007 | Mizuno | |
| 2007/0214369 A1 | 9/2007 | Roberts et al. | |
| 2008/0059730 A1 | 3/2008 | Cepulis | |
| 2008/0109607 A1 | 5/2008 | Astigarraga et al. | |
| 2008/0279382 A1 | 11/2008 | Chen et al. | |
| 2008/0282027 A1 | 11/2008 | Chen | |
| 2008/0282264 A1 | 11/2008 | Chen et al. | |
| 2009/0208004 A1 | 8/2009 | Kawai et al. | |

* cited by examiner

SECURE STORAGE SYSTEM AND METHOD OF USE

FIELD OF THE INVENTION

The present invention relates generally to data storage and more specifically to storing data securely.

BACKGROUND OF THE INVENTION

In this information age, more and more data used in corporate, financial, personal, multimedia, wireless, portable and other applications, are stored in various forms or platforms of storage places and medium. How these data are properly stored, authorized, retrieved and recovered, have become big challenges to the IT industry.

There are existing solutions and technologies to address some, but not all of the challenges effectively. It is important to be able to address the challenges mentioned above to provide an ultra-secure storage system.

Accordingly, what is needed is a system and method for overcoming the above-identified issues. The present invention addresses such a need.

SUMMARY OF THE INVENTION

A secure storage system is disclosed. The secure storage system comprises a crypto engine and a storage device. The crypto engine comprises a random number generator; a hash function; a general encryption engine; and a data encryption engine. The secure storage system further includes a storage device coupled to the crypto engine. The storage device includes a storage array. The storage array includes a public partition, a secure partition and a system partition. The public partition is accessible to the public. The secure partition is accessible through the password authentication. The system partition is accessible only by the secure storage system. The password authentication is two-level instead of one, to avoid hash collision or insider tampering. The secure partition is accessed with "access gating through access key" instead of "access control through comparison." The password can be changed without reformatting the secure storage. A secure master password mechanism is available to recover data, if necessary. A storage lock-out procedure is used to defeat brute force attack. Password request utility can be implemented through a standard browser interface on universal host platforms to call home.

The method and system in accordance with the present invention has significant advantages over the above-identified prior art. The password itself is never transferred for authentication. The original password is never processed or stored. The access key is generated by a random number generator instead of from other less random combinations. The access key is encrypted with the original password and saved. Additionally, it is a more secure mechanism, as both source (access key) and key (password) are not stored or known to the authentication device. The authentication is two-level instead of one, to avoid hash collision or insider tampering. The data is encrypted with the access key that is generated by a random number generator for better security. It does not require public-key infrastructure (PKI) and certificate server to issue public and private encryption keys.

DETAILED DESCRIPTION

The present invention relates generally to data storage and more specifically to storing data securely. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
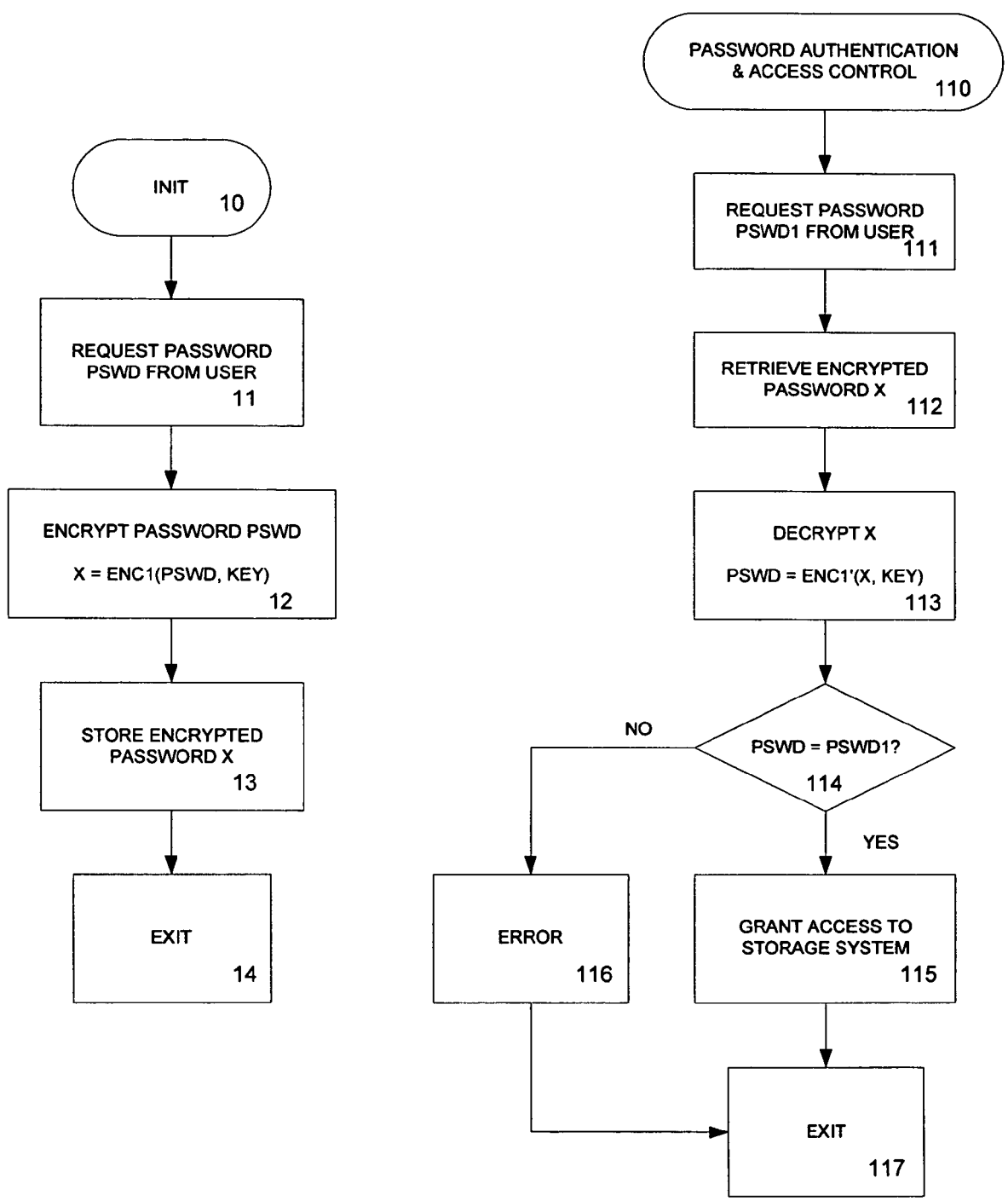
FIG. 1 is a prior art flow chart for secure storage initialization and password authentication and access control based on password encryption and comparison.

In a conventional secure storage system, such as disclosed by U.S. Pat. No. 6,880,054, entitled "Portable data storage device having a secure method of operation", PCT/SG00/00029, entitled "A Portable Data Storage Device" and U.S. Pat. No. 7,039,759, entitled "Portable data storage device", access control of the data is enforced through simple password authentication. As shown in FIG. 1, during the initialization process 10, the password (PSWD) is normally requested from the user 11. PSWD is then encrypted as X through encryption/decryption engine ENC1 12, and stored as X 13. During password authentication process 110, a second password (PSWD1) is requested from the user, via step 111. The previously encrypted password X is then retrieved, via step 112 and in turn decrypted through the same encryption/decryption engine ENC1. Here ENC1' is used to denote decryption as opposed to ENC1 as encryption. The originally stored password PSWD is then recovered 113, via step. The retrieved password PSWD is compared with the entered password PSWD1, via step 114. If the result matches, access control to the storage system is granted, via step 115. Otherwise, an error is reported, via step 116, and access is denied.

There are problems with this prior art system of FIG. 1. First, even though the original password is encrypted and stored for security purpose, it is later decrypted back to its original form explicitly and compared with the new entry. The password itself is exposed in comparison process and is prone to interception. Second, the stored password, even if encrypted, can still be cracked by the insider with know encryption mechanism and keys, due to the fact that encryption is reversible. Third, the access control is authorized and/or gated by a simple comparison routine, as is taught by U.S. Pat. No. 5,442,704, entitled "Secure memory card with programmed controlled security access control", U.S. Pat. No. 6,324,537, entitled "Device, system and method for data access control", U.S. Pat. No. 6,880,054, entitled "Portable data storage device having a secure method of operation", PCT/SG00/00029, entitled "A Portable Data Storage Device", and U.S. Pat. No. 7,039,759, entitled "Portable data storage device". This comparison routine is easy to tamper with and subject to hack by the insider.

The above mentioned prior art are usually described as "access control through comparison" mechanisms expressed either in software or hardware forms. However the "access control through comparison", is the weakness of access control in these prior art systems. The comparison is the weakest link in all of these supposedly security measures. Once it is compromised, potentially by an insider, the storage system becomes open and insecure.

Figure 2:
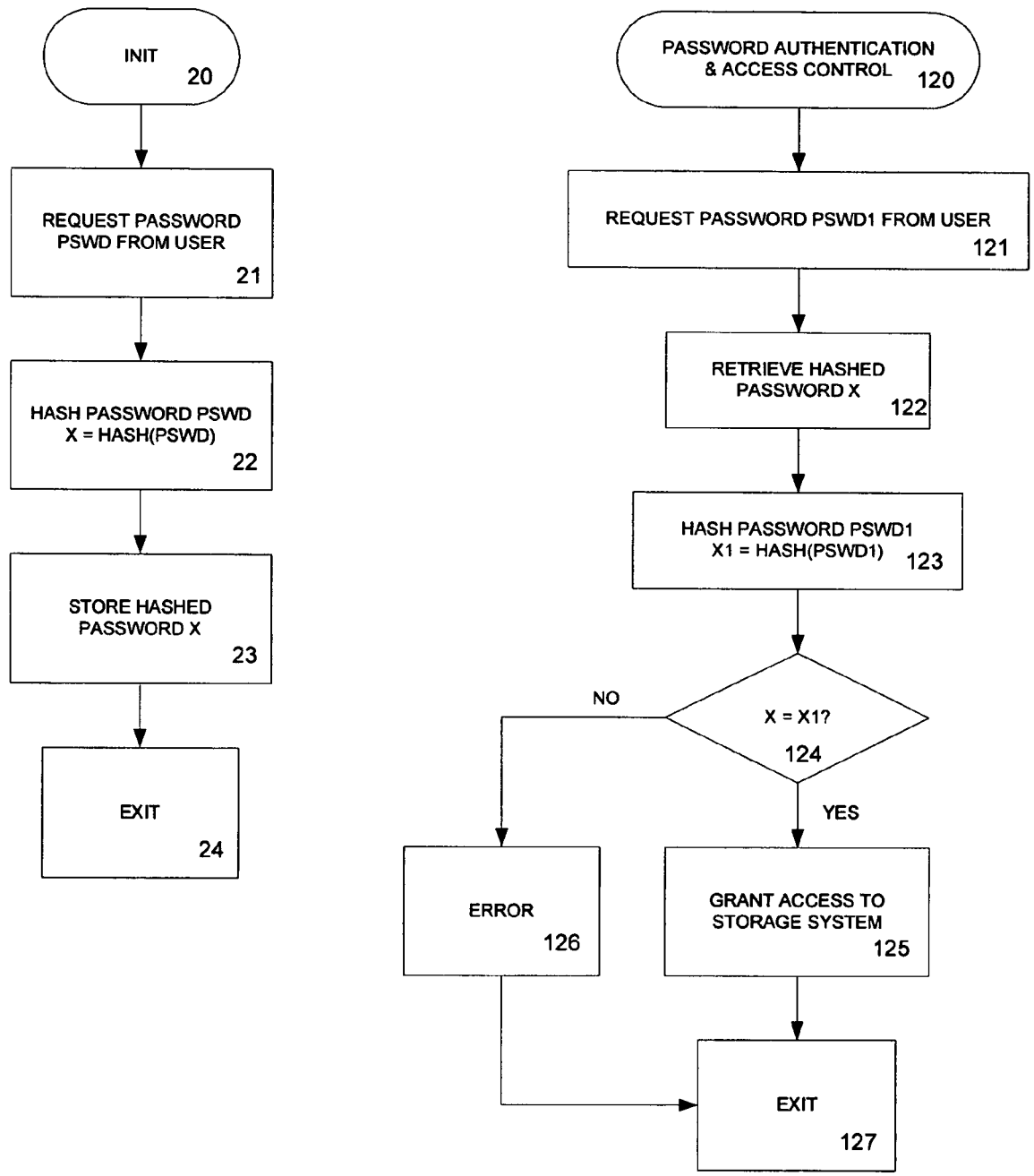
FIG. 2 is a prior art flow chart for secure storage initialization and password authentication and access control based on password hashing and comparison.

In order to carry out the "access control through comparison" function, yet not expose the original password or permission, a more elaborate prior art mechanism is introduced as shown in FIG. 2. It employs a hash function HASH 22 in place of the encryption/decryption engine ENC1 12.

Encryption transforms data from a clear text to a cipher text, while decryption transforms data from a cipher text back to a clear text. Encryption and decryption is a operation and is reversible, given the right keys. The hash function, on the other hand, transforms data into a digest or representation. It is a one-way operation and is not reversible.

As shown in FIG. 2, the requested password PSWD 21 is initially hashed through a HASH function, via step 22. The hashed password X is then stored for later use, via step 23.

During password authentication and access control process, via step 120, a password PSWD1 is requested from the user, via step 121. The original hashed password X is then retrieved, via step 122. The just entered password PSWD1 is in turn fed through the hash function HASH, via step 123. Afterward, these two hashed passwords are compared, via step 123. If the result matches, access control to the storage system is granted, via step 125. Otherwise, error is reported, via step 126, and access is denied.

Due to the fact that the original password PSWD is not stored and the stored hashed password is irreversible, this mechanism is more secure against internal hacking by an insider. It avoids the risk posed in FIG. 1 of an insider retrieving the stored passwords and trying to apply the known encryption algorithm and keys to crack from back door.

But this second prior art of FIG. 2 still has significant flaws in security. First, the system of FIG. 2 still applies the same "access control through comparison" mechanism as mentioned in all prior art above. The system does not avoid the internal sniffing or tampering of the control program. All that is necessary to bypass the comparison routine 124 and grant access to the storage system, as in step 125, is to have an insider with administrator privilege.

Second, the hash function, regardless how sophisticated it is, has a built-in collision problem. It means that there is a possibility, however unlikely, that more than one set of original data can pass through the hash function and produces the same hashed value. It implies there is a slight chance that a back door exists. For a hacker, it is possible to retrieve the hashed password and apply the known hash algorithm with trial-and-error password entries at the side until a match is found.

Another prior art reference as represented in U.S. patent Ser. No. 10/996,369/20050250473A1, entitled "Challenge response system and method", discusses a challenge response system using hash function and encryption with password. Similar to the prior art system in FIG. 2, it compares the stored hashed password and hashed password presented from the user. The problem with this approach is that the actual password is eventually decrypted and reveal by the authentication device. It potentially can be a security breach.

The two prior art approaches mentioned above, as shown in FIG. 1 and FIG. 2, try to address security of data storage in the areas of authorization through password authentication, and retrieval through access control. In summary, an "access control through comparison" mechanism is used in conventional secure storage system.

The method and system in accordance with the present invention has significant advantages over the above-identified prior art:

1. The password itself is never transferred for authentication.
2. The original password is never processed or stored.
3. The access key is generated by a random number generator instead of from other less random combinations.
4. The access key is encrypted with the original password and saved. It is a more secure mechanism, as both source (access key) and key (password) are not stored or known to the authentication device.
5. The authentication is two-level instead of one, to avoid hash collision or insider tampering.
6. The data is encrypted with the access key that is generated by a random number generator for better security.
7. It does not require public-key infrastructure (PKI) and certificate server to issue public and private encryption keys.
8. The secure data can be recovered utilizing the master password.

The method and system in accordance with the present invention is applicable in many areas including but not limited to a Flash storage system, disk storage system, disk storage system, portable storage device, corporate storage system, personal computer server, wireless communication and multimedia system.

To describe the features of the present invention in more detail, refer now to the following description in conjunction with the following description.

Figure 3:
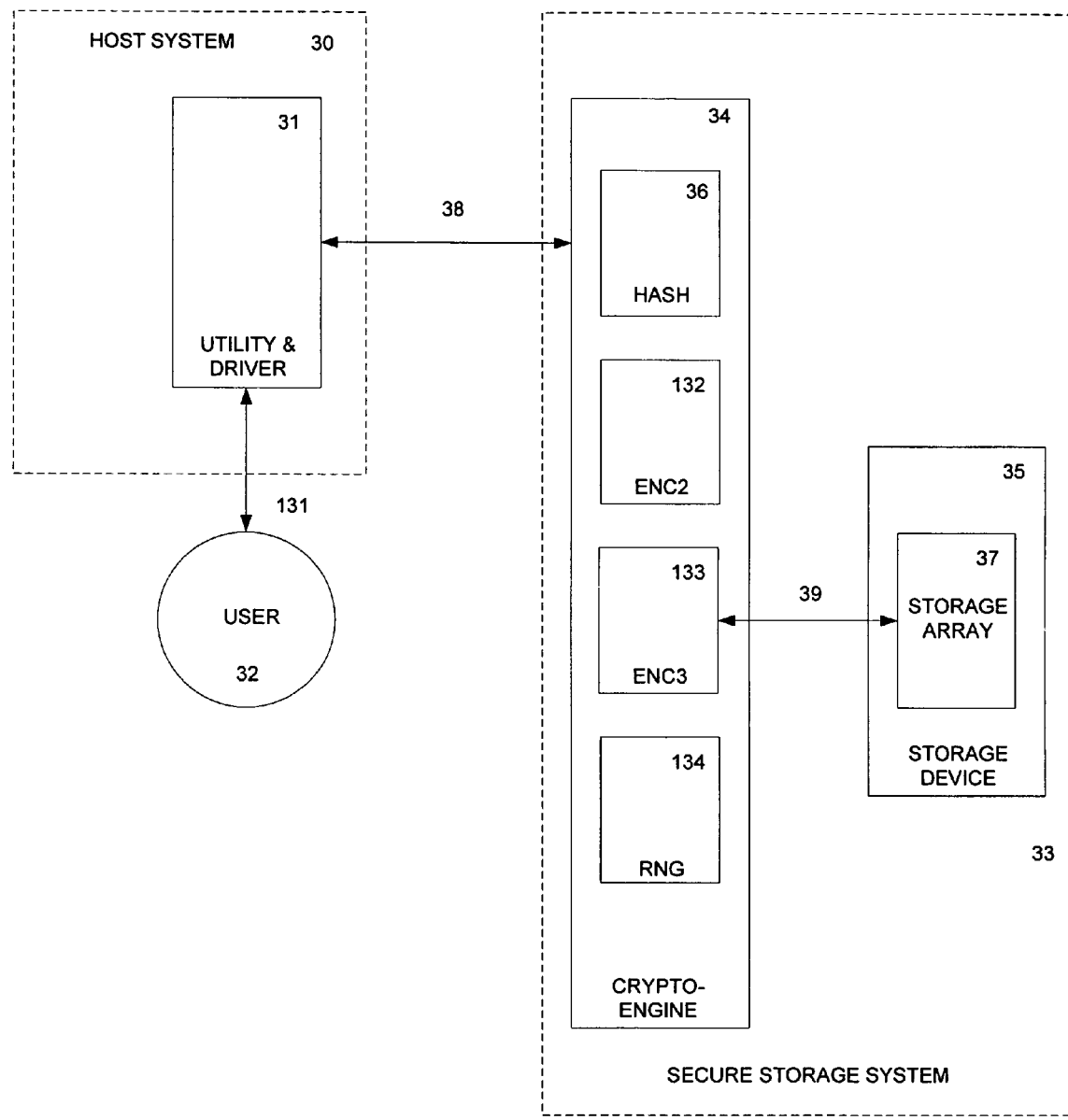
FIG. 3 is a block diagram of user, host system and secure storage system.

A block diagram of the secure storage system 33 in accordance with the present invention, is shown in FIG. 3. The host system 30, comprises a processor (not shown), memory (not shown), 10 (not shown), a utility and driver 31, a storage interface 38 and a user interface 131. It works with the user 32 through a user interface 131 and work with the secure storage system 33 through a storage interface 38.

A utility and driver 31 serves as a mediator between the storage interface 38 and the user interface 131. The utility and driver can be a software utility residing on the host system or a browser link to the secure storage data system 33. The browser link is preferable, as it is more universal and requires less system resources to work on cross platform devices.

The secure storage system 33 also includes a storage controller (not shown), memory (not shown), 10 (not shown), crypto-engine 34, a storage interface 38, and a storage device 35. The storage device 35 comprises a storage array 37 and a storage array interface 39. The crypto-engine 34 includes a random number generator RNG 134, a hash function HASH 36, a first general encryption engine ENC2 132, a second data encryption engine ENC3 133, a storage interface 38 and a storage array interface 39.

Figure 4:
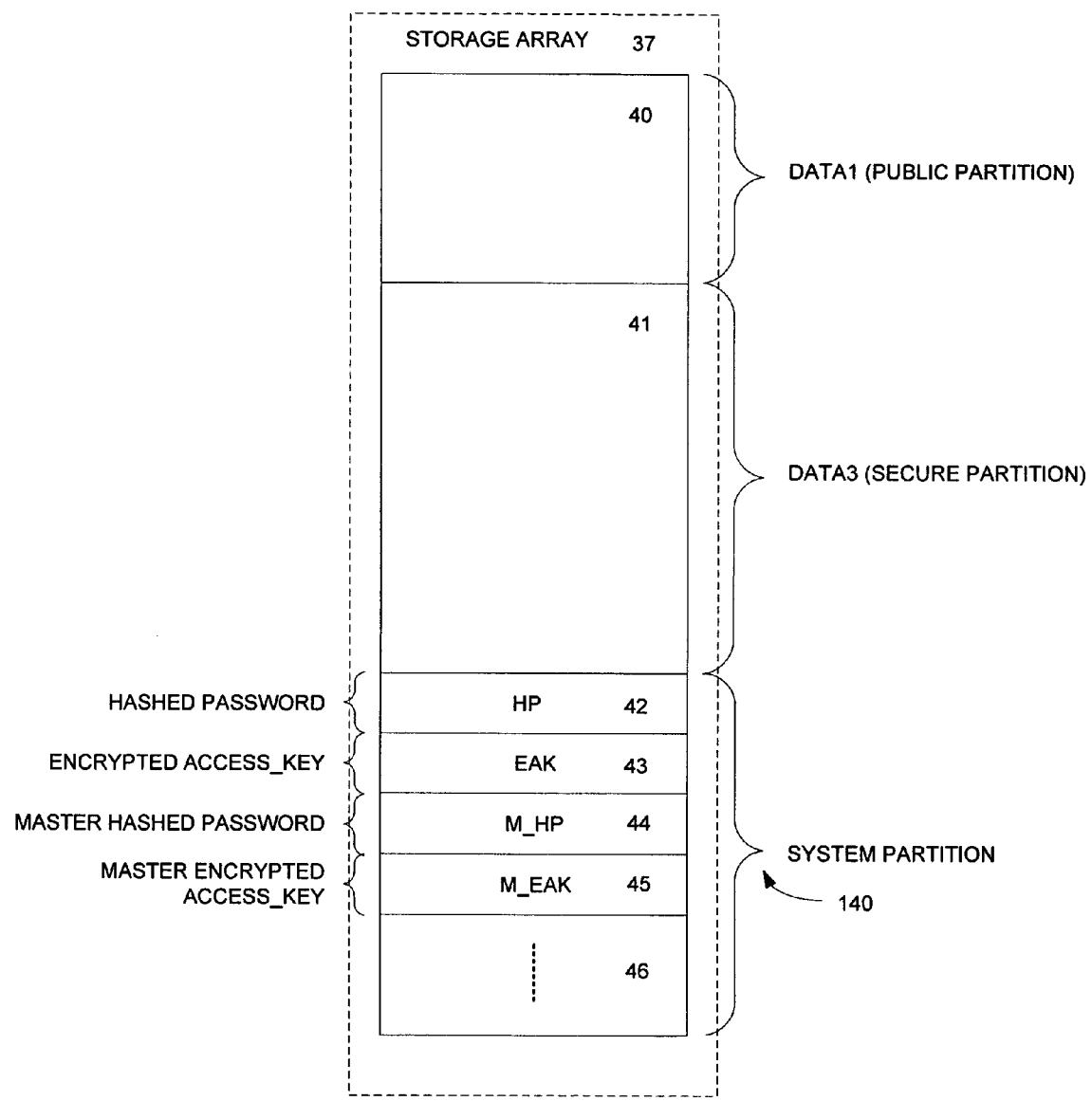
FIG. 4 is a storage element composition of storage array.

The storage array 37, as shown in FIG. 4, comprises a public partition DATA1 40, a secure partition DATA3 41 and a system partition 140. The public partition DATA1 40 is accessible to general public as the name implies. The data content is clear text and not encrypted. The secure partition DATA3 41 is encrypted and is accessible through password authentication with correct access key. The system partition 140 is accessible only by secure storage system 33 internally. It is used to store a hashed password HP 42, an encrypted access key EAK 43, a master hashed password M_HP, a master encrypted access key M_EAK 45, and other data spaces 46.

Utilities for Password Operation

There are three basic utilities for password operation in the secure storage system in accordance with the present invention. The first is (1) Initialization and Secure Partition Creation. The second is (2) Password Authentication and Access Gating. The third is (3) Password Change.

1. Initialization and Secure Partition Creation Utility

"Initialization and Secure Partition Creation" utility is concerned with:

How the passwords are created and stored?

And, how the secure partition is created?

Figure 5:
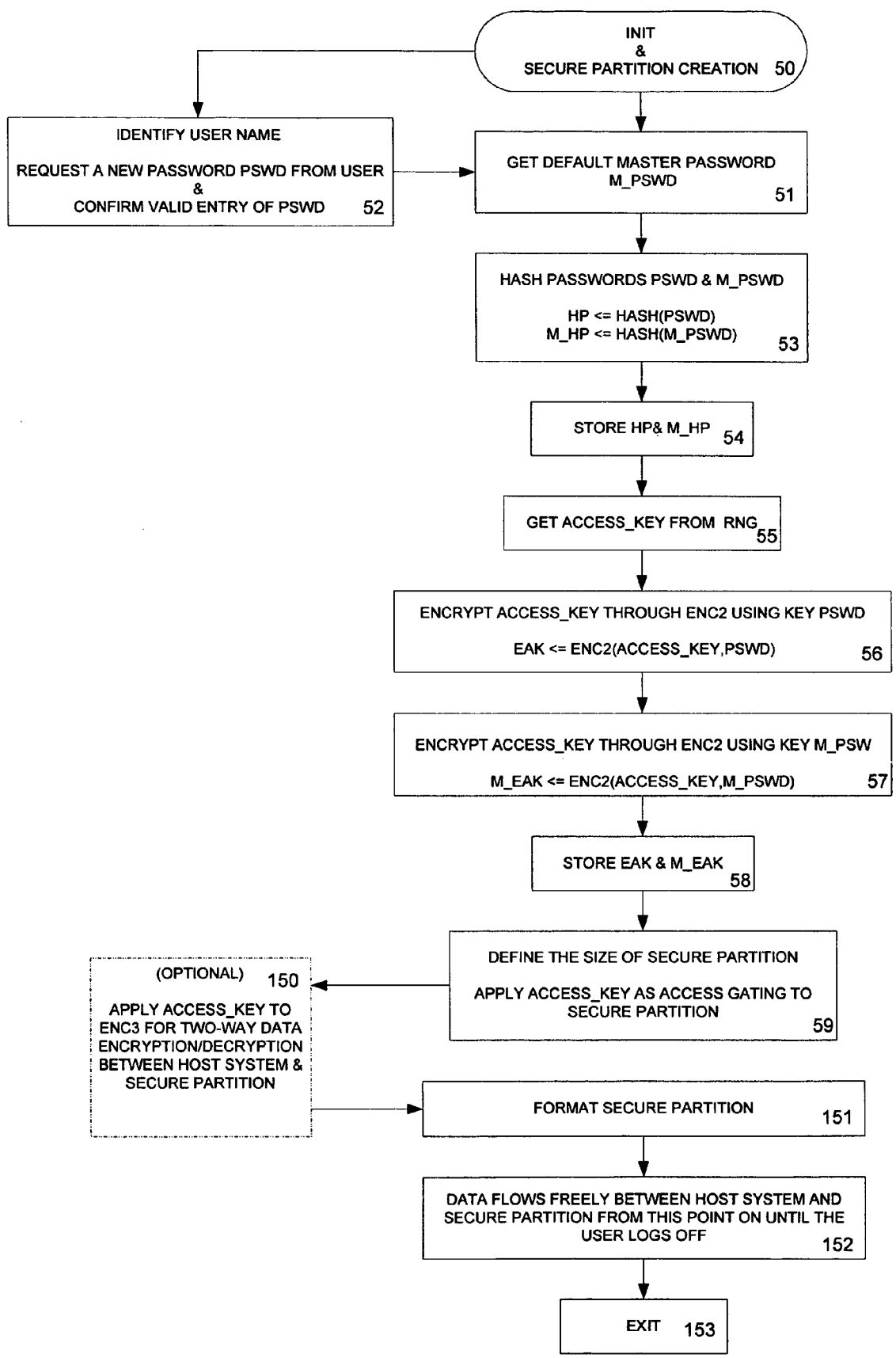
FIG. 5 is a flow chart for a secure storage initialization and secure partition creation based on hashing, master password and access gating in accordance with the present invention.

During the initialization and secure partition creating process 50, as shown in FIG. 5, the user name is identified and a new user password PSWD is requested for entry and confirmed, via step 52. The default master password M_PSWD is retrieved 51, via step. Both master password and user password are hashed through the HASH function, via step 53. The resulting hashed passwords HP and M_HP are stored, via step 54. Afterwards, an access key ACCESS_KEY is generated by the random number generator RNG, via step 55.

The access key ACCESS_KEY is encrypted through encryption engine ENC2 using user password PSWD as a key and stored as EAK, via steps 56, 58. The access key is also encrypted through encryption engine ENC2 using master password M_PSWD as a key and stored as M_EAK, via steps 57, 58. The size of the secure partition is then defined by the user. The access key ACCESS_KEY is further used as an access gating to secure partition, via step 59. The raw data is optionally encrypted/decrypted, via step 150, using ACCESS_KEY as a key through an encryption/decryption engine ENC3 between host system 30 and secure partition 41. The secure partition is formatted and prepared for use later, via step 151. Data flows freely between host system 30 and secure partition 41 from this point on until the user logs off, via step 152. The secure storage system can be re-initialized anytime by the user.

2. Password Authentication and Access Gating Utility

Figure 6:
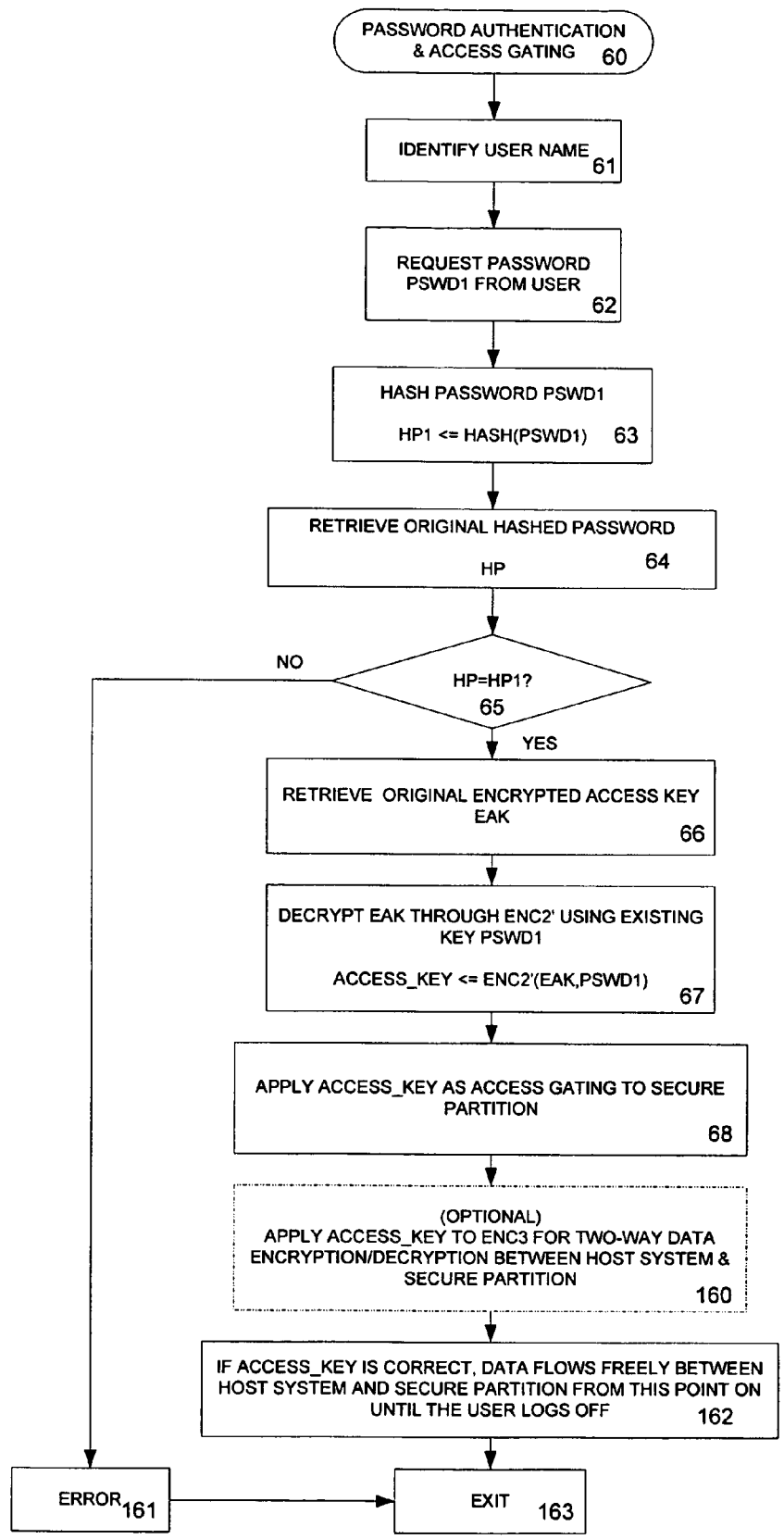
FIG. 6 is a flow chart for secure storage password authentication and access gating in accordance with the present invention.

During the password authentication and access gating process 60, as shown in FIG. 6, the user name is identified first, via step 61. The password PSWD1 is then requested, via step 62, through user interface. The password PSWD1 is then hashed as HP1 through HASH function, via step 63. The original hashed password HP is retrieved from storage, via step 64. HP and HP1 are compared to see if they match? If not, it means the password PSWD1 entered is incorrect and an error is reported, via step 161. If the result matches, then the original encrypted access key EAK is retrieved, via step 66. EAK is then decrypted through encryption/decryption engine ENC2' using user password PSWD1 as a key to retrieve access key ACCESS_KEY, via step 67. Here ENC2' is used to denote decryption as opposed to ENC2 as encryption. ACCESS_KEY is applied as access gating to secure storage. The raw data is optionally encrypted/decrypted, via step 160, using ACCESS_KEY as a key through an encryption/decryption engine ENC3 between host system 30 and secure partition 41. If access key ACCESS_KEY is correct, data flows freely between host system 30 and secure partition 41 from this point on until the user logs off, via step 162.

The access key for access gating serves as a second-level password authentication. The present invention has several advantages over conventional approaches:

a. The original password is not stored in actual storage. Only the one way hashed value of the password is stored. It is more secure.

b. Even if the hashed password is sniffed or the comparison mechanism is compromised by an insider or by a collision as in the second set of prior art, the access key can only be decrypted by the correct password presented by the user. Again, the correct password is never stored and can not be compromised. It adds extra degree of magnitude to the data security.

Once the access gating is opened through the correct access key, the data storage transfer channel is established. It adds another layer of data security to avoid hacking to the data storage in its raw data format. It utilizes another encryption/decryption engine ENC3, via steps 150, 160 to process the data between the host system 30 and the secure storage system such that data can flow freely, until the user logs off. The encrypted data, if retrieved in its raw data format, can withstand brute force attack for trial-and-error decryption without proper access key.

The password authentication and access gating utility 60 can apply to master user as well to provide a legitimate secure back door for access to data, if necessary.

3. Password Change

Figure 7:
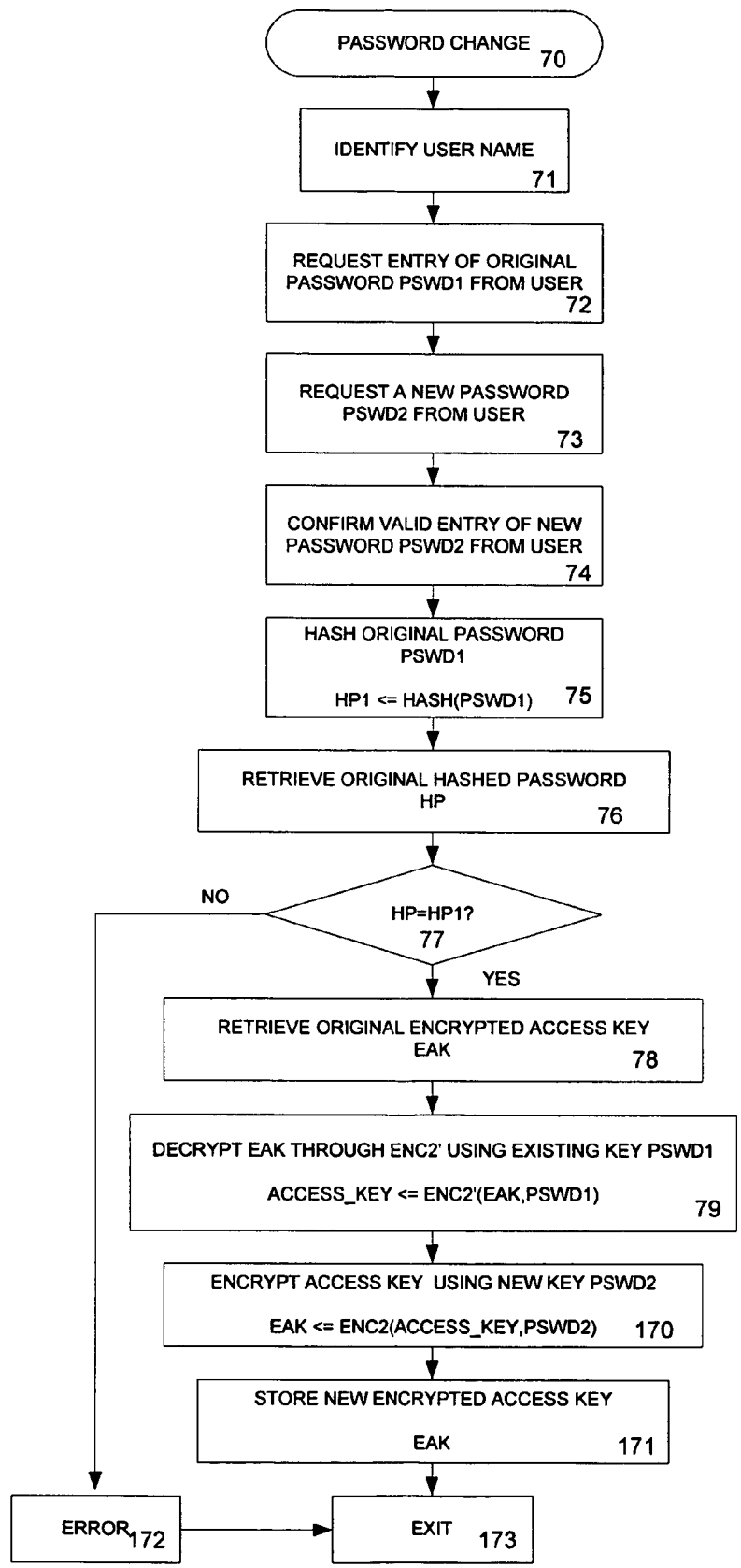
FIG. 7 is a flow chart for the invention on secure storage password change in accordance with the present invention.

During the password change process 70, as shown in FIG. 7, the user name is identified first, via step 71. The original password PSWD1 is then requested, via step 72, through user interface. A new password PSWD2 is requested from the user, via step 73. The new password PSWD2 is further confirmed by the user, via step 74. The original password PSWD1 is hashed through hash function HASH as HP1, via step 75. The original hashed password HP is then retrieved from storage, via step 76. HP and HP1 are compared to see if they match? If not, it means the password PSWD1 entered is incorrect and an error is reported, via step 172. If the result matches, then the original encrypted access key EAK is retrieved, via step 78. EAK is then decrypted through encryption/decryption engine ENC2' using user password PSWD1 as a key to retrieve access key ACCESS_KEY, via step 79. The access key ACCESS_KEY is then re-encrypted through encryption/decryption engine ENC2 using the new password PSWD2 as a key, via step 170. The resulting encrypted access key EAK is then stored, via step 171.

Figure 8:
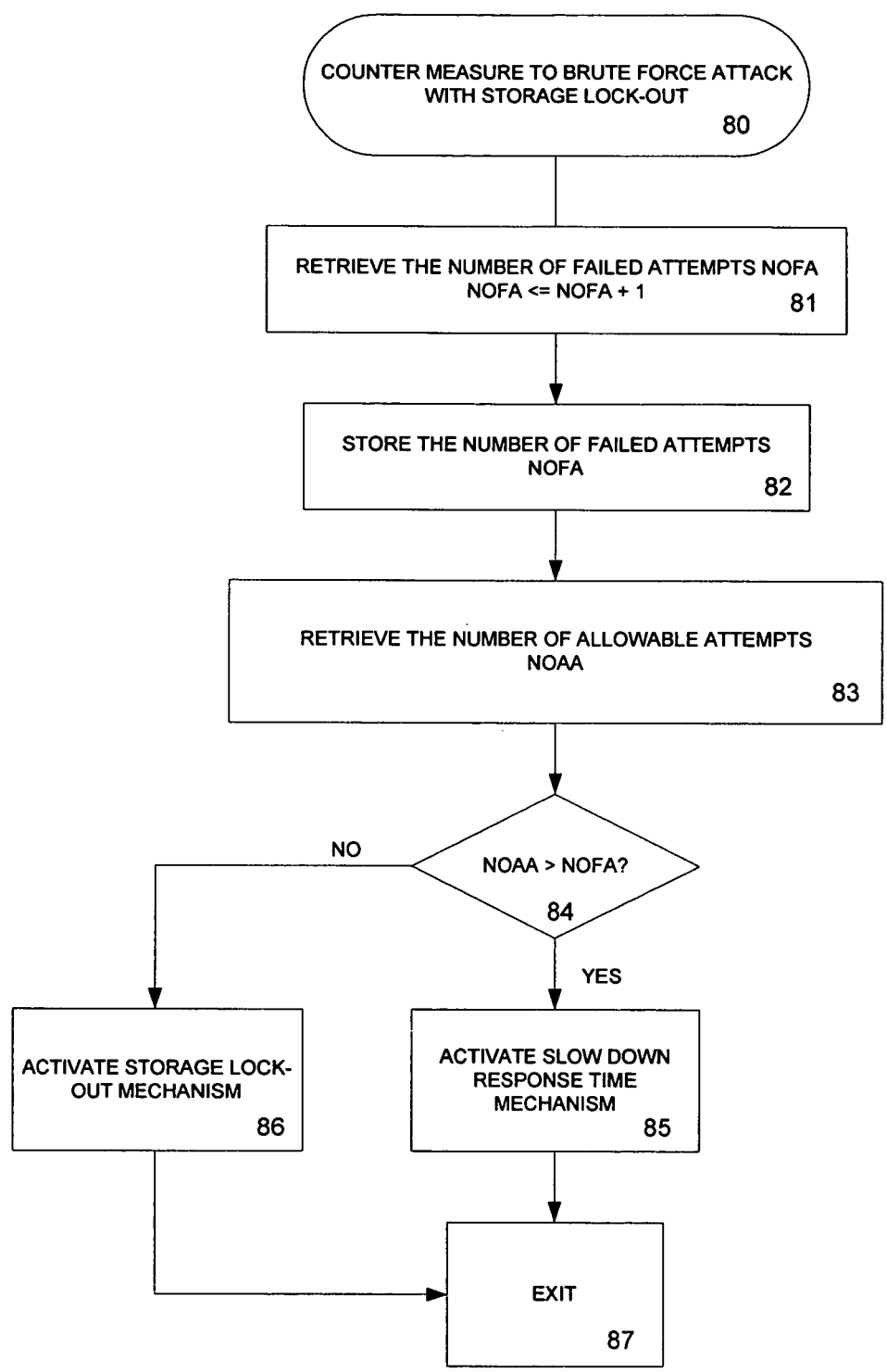
FIG. 8 is a flow chart for counter measure to brute force attack with storage lock-out in accordance with the present invention.

The password change utility 60 can apply to master user as well to change master password, if necessary. As shown in FIG. 8, it is beneficial to have a supplemental measure in addition to password protection and strong encryption to counter brute force attack against secure storage, via step 80. As a part of the error handling routine, the number of failed attempts NOFA is retrieved and the count is incremented, via step 81. The new NOFA is then stored 82. The preset number of allowable attempts NOAA is retrieved, via step 83. If NOAA is greater than NOFA, a slow-down response time mechanism is activated, via step 85. The slow-down response time mechanism is optional and is meant to slow down the next brute force attack through password guessing. The mechanism adds more response time to the next guessing attempt.

NOAA is normally preset by the administrator depends on the application requirement. If NOAA is less than or equal to NOFA, then the number of allowable attempts or attacks has been reached. A storage lock-out mechanism is activated, via step 86. The lock-out mechanism is meant to prevent the user from attempting the guessing of password, even if a correct password is provided later. The lock-out measures can be to:

Permanently lock out the next regular user request, but allow only master user access Destroy by reformatting the data storage Password request utility is generally implemented according to the host device environment. It tends to be proprietary based on different operating systems. The invention can also implement password request utility through standard browser interface (not shown in drawings). It brings along a few benefits over traditional proprietary approach:

Interface is more universal, as browser is more pervasion in various operating environments.

No additional driver is required to install. All utilities are self contained on the data storage.

A call-home mechanism can be hidden and embedded in the browser utility interface. Whenever the Internet or network connection is in place, a call-home channel can be established to allow an administrator to change master password or to manage and lock-out the secure storage system, if necessary.

The present invention intends to address issues related to a secure storage system in the following aspects:

1. Authorization of data with two-level password authentication.
2. Access of data with "access gating through access key" instead of "access control through comparison."
3. Storage/retrieval of data with encryption/decryption.
4. Change password without reformatting the secure storage.
5. Recover data with master password.
6. Defeat brute force attack with storage lock-out.
7. Implement password request utility through standard browser interface to call home.

To describe each of these features in more detail, refer now to the following description in conjunction with the accompanying figures.

1. Authorization of Data with Two-Level Password Authentication

As shown in FIG. 5, during the initialization process 50, a system and method in accordance with the invention employs the same hash function HASH as the one in the second set of prior art to process the original password PSWD, via step 52, and to store only the hashed password HP, via steps 53, 54, instead of the password itself. An access key ACCESS_KEY is generated, by a random number generator RNG, via step 55. ACCESS_KEY is encrypted using key PSWD from the original password. It results in an encrypted access key EAK, via step 56 and is stored via step 58 for later usage.

As shown in FIG. 6, during the password authentication and access gating process 60, the user name is identified via step 61, either as a regular user or a master user. The utility requests password PSWD1 from the user, via step 62. The password PSWD1 is hashed through function HASH and generates a hashed password HP1, via step 63. The original hashed password HP is retrieved, via step 64 and compared with the new hashed password HP, via step 165. If the result matches, the first-level of password authentication completes. The original encrypted access key EAK is then retrieved, via step 66. EAK is decrypted using the just entered password PSWD1 to recover the original access key ACCESS_KEY, via step 67. ACCESS KEY is applied as access gating to secure partition, via step 68.

2. Storage/Retrieval of Data with Encryption/Decryption

Once the access gating is opened through the correct access key, the data storage transfer channel is established. It adds another layer of data security to avoid hacking to the data storage in its raw data format. It utilizes another encryption/decryption engine ENC3, via steps 150, 160 to process the data between the host system 30 and the secure storage system such that data can flow freely, until the user logs off. The encrypted data, if retrieved in its raw data format, can withstand brute force attack for trial-and-error decryption without proper access key.

3. Access of Data with "Access Gating Through Access Key" Instead of "Access Control Through Comparison"

Unlike the conventional approaches that employ access control through comparison, the invention utilizes access key as an access gating to the secure partition. There is no comparison mechanism, be it through hardware or software, to be done and to be compromised. When the access key is applied, it opens door to decrypt any data that is available, be it meaningful or gobbled. Only the right access key can decrypt the meaningful data to the user. The transparency in "access gating through access key" provides effectiveness and efficiency over conventional "access control through comparison" approaches.

4. Change Password without Reformatting the Secure Storage

A conventional password implementation requires reformatting of the associated secure storage after password is changed by the user. It brings along several problems:

a. Data needs to be backed up before password can be changed b. Password change becomes not as trivial as it should have been The reason reformatting of data storage is required after password change in the conventional approach is that the encryption key for the data storage is closely associated with the password itself. The encryption key has to have a few characteristics to qualify as a good key:

Unique and secure

No back door and not easy to crack

Recoverable even after password change

The conventional approaches tend to associate the encryption key with the password. It can be secure in a way, but it may not be unique, as there can be duplicates in password selection. Since the encryption key is associated with the password, if the password can be retrieved from the data storage, as is common in the prior art, the key is easily compromised. As such, a back door exists for the encryption key and the key is crackable. Since the encryption key is associated with the password, once the password is changed, the key has to change as well. Therefore the secure partition has to be reformatted whenever the encryption key is changed. And the data itself has to be backed up before the secure partition is reformatted, in order to preserve the original data. It is a very cumbersome process for the user.

A system and method in accordance with the present invention, on the other hand, uses a random number generator to generate a unique and secure access key for the secure storage. It is a one-time process only after the user chooses to generate the secure partition initially or to re-generate the secure partition afterwards. It is more unique and secure than the password associated encryption key disclosed in conventional systems. The access key is used to encrypt and decrypt the data stored in secure storage.

The access key is encrypted by the original user password. The encrypted access key is stored for later retrieval, but the user password is never stored. Instead, only the hashed password, or the digest of the password, is stored. Since the hashed password is a one-way digest of the password, it is not retrievable and thus provide extra security to the secrecy of the access key. The access key can only be decrypted by the correct password provided by the user. It therefore presents no back door and is not easy to crack.

Even though the access key is very secure and not easy to crack, it is yet recoverable with the combined hash and encryption mechanism described. The combined mechanism can be used by different password to secure the data storage without changing the access key. Not having to reformat the data storage whenever the password changes, it provides convenience and flexibility for user to manage their password and secure storage effectively.

5. Recover Data with Master Password

For security reasons, the secure storage should not have any back door to breach the security. But under certain circumstances, there is a need to have a master password as a back door to recover data from the secure storage. In one example, the rightful user of the data storage may forget the user password. In another example, the data content needs to be retrieved without the original user's consent for lawful reason. How the master password is able to associate with the user password without user knowledge and to keep up with the secure storage access key generation is a big challenge in conventional systems.

As shown in FIG. 5, during the initialization process 50, the present invention employs the same hash function HASH as the one in the second set of prior art to process the default master password M_PSWD 51 and to store only the master hashed password M HP 53, 54, instead of the master password itself. ACCESS_KEY is encrypted using key M_PSWD from the original master password. It results in a master encrypted access key M_EAK 57 and is stored 58 for later usage.

The default master password is fixed initially. It should be changed by the system administrator as soon as the data storage initialization process is complete and detected. The master password is hidden from the access and knowledge of the regular user. Even though the user is able to initialize the secure storage anytime he or she wishes to and in turn resets the master password to default. But the default master password is kept secret by the administrator. For further security measure, the default master password can be changed as soon as the administrator learns that the secure storage has been initialized, through the call-home mechanism described later in this invention.

As soon as there is a need to unlock secure storage, the master user name is identified and the master password is entered through the same password authentication and access gating utility 40. The proper access key for access gating is retrieved and the data channel is opened. The clear text data flows freely from this point on and data is recovered.

6. Defeat Brute Force Attack with Storage Lock-Out

Regardless how secure is the encryption algorithm, there is always a threat from the brute force attack that tries all combinations possible to unlock the encryption. The invention implements a counter to store the number of fail attempts, as shown in FIG. 8. Once the count of the number of fail attempts exceeds the number of allowable attempts, a counter measure is activated. The counter measure intends to achieve one or multiple of the following result:

a. Slow down the response time from data storage system.

b. Permanently lock out regular user request, but allow only master user access.

c. Destroy the data storage permanently.

7. Implement Password Request Utility Through Standard Browser Interface to Call Home A call-home mechanism can be hidden and embedded in the browser utility interface. Whenever the Internet or network connection is in place, a call-home channel can be established to allow an administrator to change master password or to manage or lock-out the secure storage system, if necessary.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A secure storage system comprising:
a crypto-engine, wherein the crypto-engine includes a random number generator, a hash function, a general encryption engine, and a data encryption engine;
a storage device coupled to the crypto-engine, wherein the storage device includes a storage array comprising a public partition that is accessible to the general public, a secure partition that is accessible only by a two-level password authentication, and a system partition that is accessible only by the secure storage system; and
wherein the secure storage system performs the following functions comprising:
receiving a first user password from a host system;
retrieving a default master password from the secure storage system;
hashing the first user password and the default master password, wherein the hashed first user password and the hashed default master password are stored in the secure storage system;
generating an access key using a random number generator and encrypting the access key with the first user password to create a first encrypted access key and with the default master password to create a second encrypted access key, wherein the first and the second encrypted access keys are stored in the secure storage system;
receiving a second user password from the host system;
hashing the second user password to compare the hashed first user password to the hashed second user password which serves as a first level of the two-level password authentication;
in response to matching hashed first and second user passwords, decrypting the first encrypted access key using the second user password as a key to retrieve and apply the access key for access gating to the secure storage system which serves as a second level of the two-level password authentication; and
utilizing another encryption/decryption engine to process data between the host system and the secure storage system until a user session is terminated.

2. The secure storage system of claim 1 wherein the system partition is utilized to store a hashed password, an encrypted access key, a master hashed password, a master encrypted access key and other data spaces.

3. The secure storage system of claim 2 wherein data can be recovered utilizing the master password.

4. The secure storage system of claim 2 wherein the data encryption engine is further utilized to process data between the host system and the secure storage system and provides protection from a brute force attack of multiple attempts to decrypt the data without a proper access key.

5. The secure storage system of claim 2 wherein a unique and secure access key is associated with a change of password without reformatting the secure storage.

6. The secure storage system of claim 2 wherein a password request utility can be implemented through a standard browser interface on a universal host platform to call home and allow for a change in a user password or the default master password.

7. A computer-implemented method for creating and storing passwords in a secure storage system by utilizing a two-level password authentication to allow a flow of data through access gating, wherein the computer performs the following functions comprising:

receiving a first user password from a host system;

retrieving a default master password from the secure storage system;

hashing the first user password and the default master password, wherein the hashed first user password and the hashed default master password are stored in the secure storage system;

generating an access key using a random number generator and encrypting the access key with the first user password to create a first encrypted access key and with the default master password to create a second encrypted access key, wherein the first and the second encrypted access keys are stored in the secure storage system;

receiving a second user password from the host system;

hashing the second user password to compare the hashed first user password to the hashed second user password which serves as a first level of the two-level password authentication;

in response to matching hashed first and second user passwords, decrypting the first encrypted access key using the second user password as a key to retrieve and apply the access key for the access gating to the secure storage system which serves as a second level of the two-level password authentication; and utilizing another encryption/decryption engine to process data between the host system and the secure storage system until a user session is terminated.

8. The computer-implemented method of claim 7 wherein the size of a secure partition in the secure storage system is defined by the user.

9. The computer-implemented method of claim 7 wherein a data encryption engine is further utilized to process data between the host system and the secure storage system and provides protection from a brute force attack of multiple elements to decrypt the data without a proper access key.

10. A non-transitory computer readable medium containing program instructions wherein the program instructions are executed by the computer for creating and storing passwords in a secure storage system by utilizing a two-level password authentication to allow a flow of data through access gating, wherein the computer performs the following functions comprising:

receiving a first user password from a host system;

retrieving a default master password from the secure storage system;

hashing the first user password and the default master password, wherein the hashed first user password and the hashed default master password are stored in the secure storage system;

generating an access key using a random number generator and encrypting the access key with the first user password to create a first encrypted access key and with the default master password to create a second encrypted access key, wherein the first and the second encrypted access keys are stored in the secure storage system;

receiving a second user password from the host system;

hashing the second user password to compare the hashed first user password to the hashed second user password which serves as a first level of the two-level password authentication;

in response to matching hashed first and second user passwords, decrypting the first encrypted access key using the second user password as a key to retrieve and apply the access key for the access gating to the secure storage system which serves as a second level of the two-level password authentication; and utilizing another encryption/decryption engine to process data between the host system and the secure storage system until a user session is terminated.

\* \* \* \* \*